United States Patent [19]

Ruff et al.

[11] 4,018,581
[45] Apr. 19, 1977

[54] SOLAR HEATING SYSTEM

[76] Inventors: John Denis Ruff, 206 Birch St.;
Phillip Rood Wheeler, 209 Pine St.,
both of Alexandria, Va. 22305

[22] Filed: Jan. 22, 1976

[21] Appl. No.: 651,275

Related U.S. Application Data

[63] Continuation-in-part of Ser. No. 533,630, Dec. 17, 1974, Pat. No. 3,960,322.

[52] U.S. Cl. .................................. 62/2; 60/641;
60/671; 62/238
[51] Int. Cl.² ................................ F25B 27/00
[58] Field of Search .......... 62/2, 238, 467 PR, 116;
60/641, 651, 671

[56] References Cited

UNITED STATES PATENTS

| 1,119,063 | 12/1914 | Burnap | 60/641 X |
| 2,160,733 | 5/1939 | Henney | 62/116 X |
| 2,942,411 | 6/1960 | Hutchings | 60/641 |
| 3,823,573 | 7/1964 | Cassady | 62/116 X |
| 3,967,450 | 7/1976 | Girardier | 60/671 X |

*Primary Examiner*—William E. Wayner
*Assistant Examiner*—William E. Topolcai, Jr.

[57] ABSTRACT

A heating system using heat derived from solar collectors to operate a reciprocating piston heat engine which provides operating power to drive a heat pump, and with additional capability to operate as a heat pump with electric motor drive, and with separate inlet valves for heat engine and heat pump operation.

1 Claim, 2 Drawing Figures

SOLAR HEATING SYSTEM

This application is a continuation in part of our co-pending application "Solar Heat Pump" filed on Dec. 17, 1974 (Ser. No. 533,630), now U.S. Pat. No. 3,960,322.

The object of this invention is to provide a simpler solar powered heat engine, heat pump, heating system, with high efficiency. As with our earlier invention, higher heating output is provided for a given solar collector panel output. Also capability to operate as an electrically driven heat pump is provided. And we use two separate inlet valves in the heat engine cylinder. The secondary inlet valve can be used when the system is operating as an electrically driven heat pump. This allows some simplification of the system.

The main advantage of this system is that higher heating output for a given solar collector panel size enables more heat storage and thus in night and dull weather operation, less supplementary heating is required, resulting in considerable savings. Also when using the heat pump capability as a supplementary heating system, stored water enables a more economical heat pump operation by providing a higher temperature heat source than outside air.

THIS INVENTION COMPRISES

A primary high temperature boiler in which a working medium (refrigerant) such as Freon 12 is caused to boil at a relatively high temperature (and pressure) by heat derived from solar heating panels.

A condenser in which refrigerant vapor condenses at a temperature a little above the temperature of a heated space, providing a source of heating for this space.

A positive displacement, heat engine/compressor unit in which the pressure difference between the boiler and the condenser is used to provide motive power (in a heat engine function) to drive the compressor function.

An evaporator (of the flooded type) in which refrigerant is caused to evaporate to vapor by heat supplied by the outside air (or water), and this vapor is drawn by the compressor function and discharged to the condenser in the function of a heat pump.

A specialized secondary inlet valve associated with the heat engine components through which vapor is drawn from the evaporator, so that the heat engine components can be used as additional components of the compressor function, when required.

IN THE DRAWINGS

HEATING WITH SOLAR POWERED ENGINE

Figure 1:
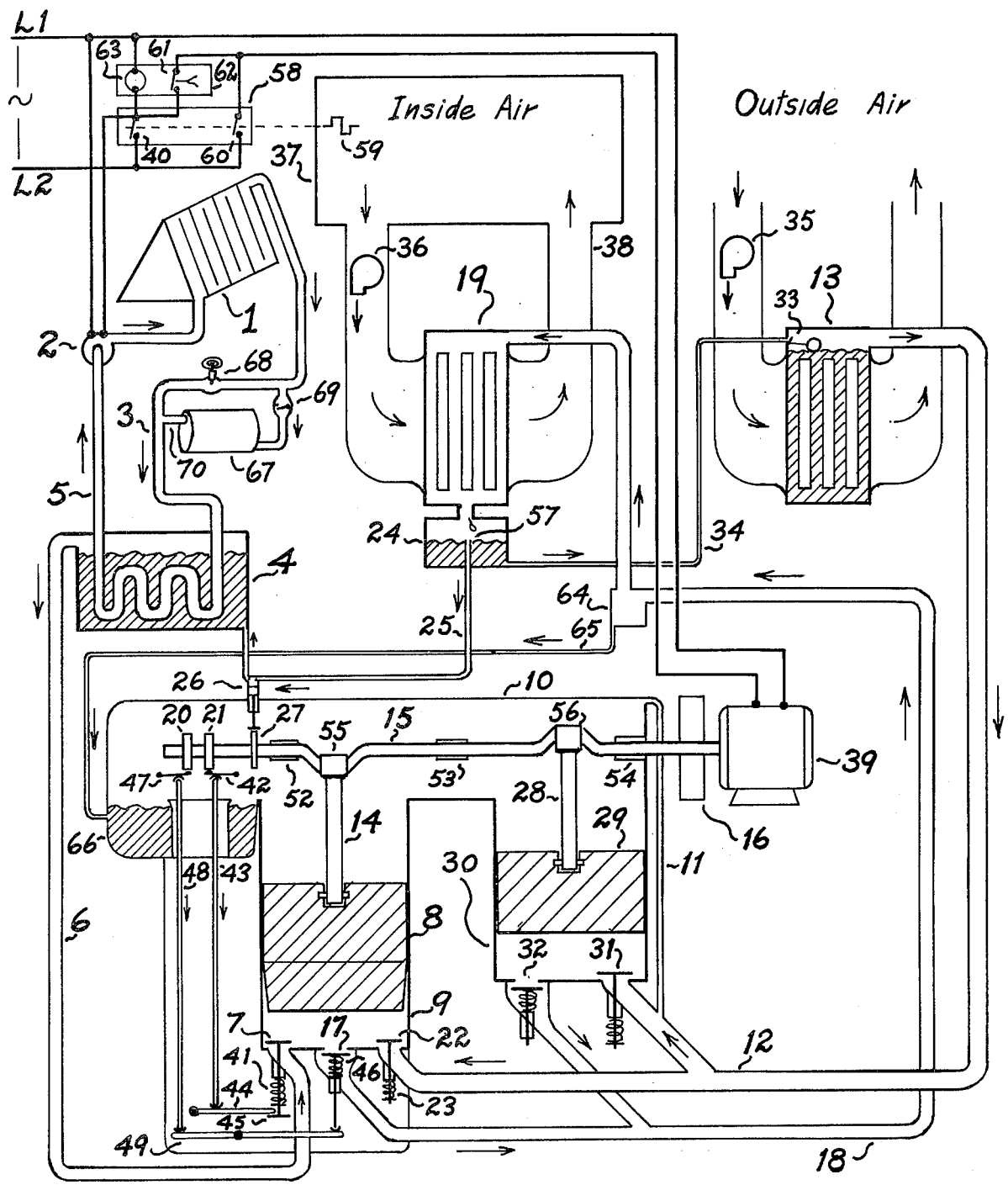
FIG. 1 shows the general arrangement and operation of the system.

FIG. 1. shows solar collector panel 1 through which pump 2 causes water (or any other suitable liquid) to flow. This water is heated by solar radiation as it flows through the panel, and water heated in this manner flows through pipe 3 to provide heating of boiler 4. Return water flows through pipe 5 back to pump 2.

Boiler 4 is thus maintained at a temperature high enough to provide pressure for heat engine operation. This temperature can be above 200° (with high solar output) for high engine output. But at temperatures as low as 100° (with poor solar output) some useful engine output can still be maintained. For a working medium, a quantity of liquid refrigerant (typically Freon 12) is maintained in boiler 4. When this refrigerant boils in boiler 4, refrigerant vapor at pressure travels through boiler pipe 6, through primary inlet valve 7, to exert pressure on the underside of piston 8, which moves in cylinder 9. The topside of piston 8 is exposed to the pressure existing in crankcase enclosure 10, which is connected by equalizer pipe 11 to suction line 12, which connects to evaporator 13, in which the pressure is less than the pressure in boiler 4. Then, since the top side pressure on piston 8 is less than the underside pressure, it will tend to move upward in cylinder 9 in a power stroke. Piston 8 is connected by rod 14 to crankshaft 15 which is caused to rotate by the powerstroke. Flywheel 16 maintains momentum, and after top dead center, piston 8 goes downward in an exhaust stroke and pushes vapor through exhaust (discharge) valve 17, through discharge pipe 18 to condenser 19 which is cooled by a flow of inside air, which is generally at a temperature around 72°. The temperature of condenser 19 is thus maintained lower than the temperature of boiler 4, so the condensing pressure is thus always lower than the pressure in boiler 4. Consequently the power produced in the power stroke is greater than the power absorbed by the exhaust stroke. Thus the power and exhaust strokes are repeated in a continuous cycle, and rotation of crankshaft 15 continues as power is developed in a heat engine function. Valves 7 and 17 are controlled by cams 20, 21 so that primary inlet valve 7 is only open during the power stroke, and exhaust (discharge) valve 17 is only open during the exhaust stroke. Secondary inlet valve 22 is a poppet valve with valve spring 23. Since the pressure in cylinder 9 is greater than the pressure in suction line 12 (during engine operation) valve 22 remains closed. Refrigerant vapor condenses in condenser 19 and the liquid (refrigerant) drains into receiver 24, then through liquid line 25 to injector pump 26, which injects liquid into boiler 4. Injector pump 26 is a reciprocating pump activated by cam 27 on crankshaft 15, but could alternately be a gear pump or any other suitable type of pump.

Crankshaft 15, through rod 28 actuates compressor piston 29 in cylinder 30. Piston 29 draws vapor on its upward (suction) strokes through inlet valve 31, through suction line 12 from evaporator 13. On downward (compression) strokes piston 29 forces the vapor through discharge valve 32 into discharge pipe 18, where it mixes with vapor discharged from cylinder 9 through exhaust (discharge) valve 17. This vapor mixture travels to condenser 19, to condense and furnish heat, to heat the inside air. Evaporator 13 is of the flooded type and float valve 33 maintains the liquid level by supplying liquid refrigerant through liquid line 34 from receiver 24. Circulating fan 35 pulls air from the outside heat sink and this outside air is passed through evaporator 13 and provides heat of vaporization. Evaporator 13 is thus maintained at a temperature close to (but a little below) outside ambient. Air then flows from evaporator 13 back to the outside heat sink. Circulating fan 36 pulls inside air from within the heated space 37 and moves it through condenser 19 where it picks up heat and is then discharged through duct 38 to provide heating of space 37. Motor 39 is coupled to crankshaft 15, and any time that heat engine operation is to be commenced (after having been stopped), motor 39 is energized (when thermostat switch points 40 are closed). This causes motor 39 to rotate shaft 15, and rotation of the heat engine is commenced. After rotation is commenced, motor 39 can be de-energized and the rotor of motor 39 continues to turn during heat engine operation, though the motor is de-energized. Automatic control of stopping and starting of motor 39 is shown later in this disclosure.

Primary inlet valve 7 is a poppet valve with valve spring 41 tending to pull it closed. Pressure in boiler pipe 6, greater than the pressure in cylinder 9, pushes valve 7 open against the pressure of valve spring 41, thus admitting high pressure vapor from boiler pipe 6 into cylinder 9 for the (upward) power strokes of the heat engine. But during the (downward) exhaust strokes, valve 7 must be kept closed; so during these (downward) exhaust strokes, cam 21 pushes downward on cam follower 42, which pushes on push-rod 43, which pushes on rocker 44, which applies pressure to flange 45 on the stem of primary inlet valve 7 to hold it closed. During the (upward) power strokes cam 21 does not exert pressure to keep valve 7 closed, but valve 7 is allowed to open under the influence of pressure in boiler pipe 6.

Exhaust (discharge) valve 17 tends to remain closed under the pressure of valve spring 46. But during the (downward) exhaust strokes, with primary inlet valve 7 being kept closed by pressure from cam 21 (as already described), piston 8 generates pressure in cylinder 9 greater than the pressure in discharge pipe 18. This pressure pushes exhaust (discharge) valve 17 open and the vapor in cylinder 9 is thus exhausted into discharge pipe 18 during these (downward) exhaust strokes of heat engine operation. But during the (upward) power strokes, valve 17 must be kept closed to prevent incoming vapor escaping directly into discharge pipe 18; so during the (upward) power strokes, cam 20 pushes downward on cam follower 47, which pushes on push-rod 48, which pushes on rocker 49, which applies pressure to the stem of valve 17 to hold it closed. During the (downward) exhaust strokes cam 20 does not exert pressure to keep valve 17 closed, but valve 17 is allowed to open under the influence of pressure in cylinder 9.

Figure 2:
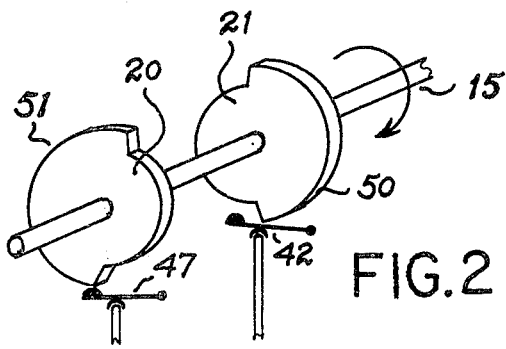
FIG. 2 shows a detailed view of the cams which control the inlet and exhaust (discharge) valves of the heat engine function.

FIG. 2 shows cams 20, 21 on shaft 15 and cam followers 42, 47. Outer surface 50 of cam 21 only causes pressure on cam follower 42 during (downward) exhaust strokes. Outer surface 51 of cam 20 only causes pressure on cam follower 47 during (upward) power strokes.

Shaft bearings 52, 53, 54 (FIG. 1) support shaft 15, and rod bearings 55 and 56 connect to rods 14 and 28. Lubrication of these bearings and of pistons 8 and 29 is by conventional means such as oil pump circulation, splash feed or any other suitable system.

The refrigerant charge in the system is sufficient so that when evaporator 13 is filled with liquid up to float valve 33, additional liquid draining from condenser 19 overflows into stand pipe 57 and drains to injector pump 26 to be pumped into boiler 4; so that with all the liquid in condenser 19 drained into receiver 24 (and thence pumped into boiler 4) a suitable working liquid level is maintained in boiler 4.

The operation of the system, as described above, provides the advantage that with all the heat originating in solar collector panel 1 being dispersed through condenser 19, additional heat absorbed from the outside heat sink (in evaporator 33) is dispersed also through condenser 19 in the function of a heat pump. This additional heat is considerable and in conditions of mild outside temperature more than 100% increase in heat output is obtained. This general principle is not new, and the patent of Steuart (U.S. Pat. No. 1,871,244) is cited. But our invention involves new and improved equipment with greater versatility.

CONTROLS

Control of the system is achieved by two stage thermostat 58 with sensing element 59 located in space 37. Typical settings for thermostat 58 are for first stage points 40 to close on drop of temperature at 72° and open on rise at 73°; and for second stage points 60 to close on drop at 71° and open on rise at 72°. In operation: with space temperature above 73°, points 40 and 60 are open and electric power for L2 does not reach pump 2 or motor 39, so the system does not function. When temperature in space 37 drops to 72°, first stage points 40 close and pump 2 is energized. Also current flows through the normally closed points 61 of timer 62 to energize motor 39. Conductor L1 is connected permanently to pump 2 and motor 39 to complete the electrical circuit. As hot water is pumped through boiler 4, vapor pressure is generated, and with motor 39 causing starting rotation of crankshaft 15, heat engine operation is commenced. At the time when points 40 closed, coil 63 of timer 62 also was energized. After a preset time (typical 2 min) timer points 61 open and motor 39 is de-energized, but with heat being supplied to boiler 4, heat engine operation continues. When temperature in space 37 rises to 73° thermostat 58 is satisfied, and points 40 open. Pump 2 is de-energized and with no hot water going to boiler 4, heat engine operation stops.

HEAT PUMP OPERATION

At times the water pumped through boiler 4 is not hot enough to provide sufficient heat and pressure in boiler 4, to provide sufficient heating of space 37. This occurs during cloudy weather, at night, or in very cold weather. Temperature then drops in space 37. At 71°, second stage points 60 close and motor 39 is energized continually and drives crankshaft 15 to actuate piston 29 in cylinder 30, to draw vapor from evaporator 13 and compress it into condenser 19 in the heat pump function already described. In addition, with crankshaft 15 actuating piston 8 in cylinder 9, vapor flows from boiler 4 through primary inlet valve 7, into cyliner 9, during upward strokes, and out through exhaust (discharge) valve 17, during downward strokes to condense in condenser 19 and add to the heating output. This continuous energization of motor 39 is often employed at times when the solar heated water flowing from pipe 3 into boiler 4 is still warmer than condenser 19. In this case some heat engine power is developed at piston 8, and this power assists motor 39. But when the solar heated water temperature deteriorates to a temperature below the temperature of condenser 19, piston 8 derives power from crankshaft 15 and functions as a heat pump compressor, drawing vapor (during upward strokes) through primary inlet valve 7, from boiler 4 (which now acts as an evaporator heat source). Piston 8 compresses the vapor (during downward strokes) and discharges it through exhaust (discharge) valve 17, into discharge pipe 18 to condense in condenser 19 and add to the system heating output. This function is known as a solar assisted heat pump.

At times when motor 39 is energized continuously and there is no solar heating output from collector panel 1, (such as at night or overcast days) the temperature of the water flowing through boiler 4 drops below the temperature of the outside heat sink. Then the pressure in boiler pipe 6 is lower than the pressure in suction line 12. So, as piston 8 starts to rise on upward strokes (after bottom dead center), secondary inlet valve 22 opens to admit vapor from suction line 12, and primary inlet valve 7 does not open (since there is insufficient pressure in boiler pipe 6). Operating in this manner pistons 8 and 29 are both drawing vapor from evaporator 13, through suction line 12, through secondary inlet valve 22, and inlet valve 31 respectively, during their upward strokes; compressing this vapor during their downward strokes, and discharging it through exhaust (discharge) valve 17 and discharge valve 32, through discharge pipe 18 to condense in condenser 19. This function is as an electrically driven air to air heat pump, with the outside heat sink furnishing heat to evaporator 13, with motor 39 driving pistons 8 and 29 to compress vapor drawn from evaporator 13, and discharge it into condenser 19, which heats circulated air, to heat space 37.

When the temperature in space 37 rises (due to the heating effect) second stage points 60 in thermostat 58 open and motor 39 is de-energized and system operation stops. Should solar output have resumed while second stage points 60 were closed, pressure would build up again in boiler 4, and then when second stage points 60 open, the heat engine operation would continue until either first stage points 40 open to shut the system down, or second stage points 60 close again to energize motor 39.

The function of primary inlet valve 7 and exhaust (discharge) valve 17 is similar in heat engine and heat pump operation, in that during both types of operation primary inlet valve 7 is open only during upward strokes of piston 8, and exhaust (discharge) valve 17 is open only during downward strokes of piston 8. These valves open (against their respective valve springs) only under the influence of pressure, and for this reason primary inlet valve 7 does not open at all when the pressure in boiler pipe 6 is less than the pressure in suction line 12. In this case secondary inlet valve 22 is the operating inlet valve. Conversely, when the pressure in boiler pipe 6 is greater than the pressure in suction line 12, secondary inlet valve 22 does not open and primary inlet valve 7 is the operating inlet valve.

The invention as described shows air as the fluid medium circulated to convey heat from condenser 19 to space 37. Alternately a hydronic (water) circulating system can be used. Also the outside heat sink employed is air, but alternately, water from ground or stream can be used as a heat source to evaporator 13. These variations of circulated mediums are commonly employed with heating (and heat pump) systems.

Cylinders 9 and 30 are shown inverted, so that any refrigerant which condenses during heat engine operation can drain out through the discharge valves. This feature is described in detail in our earlier co-pending application (Ser. No. 533,630). Oil separator 64 installed on discharge pipe 18 traps oil carried over from the engine/compressor units and returns it through oil line 65 to oil sump 66 in the manner of conventional oil separators.

Storage tank 67 is used to store hot water during times when solar collector panel 1 is providing greater heat output then is required to maintain heating of space 37. At such times valve 68 is used to throttle water flow. This throttling causes hot water to flow through check valve 69 into tank 67, and cooler waer is displaced from tank 67 through pipe 70 to mix with hot water in pipe 3. Checkvalve 69 needs a slight forward pressure to open it, and throttling by valve 68 forces pressure onto checkvalve 69 and thus maintains a flow through it. A system of automatic control of such storage tank valves is shown in our earlier co-pending application (Ser. No. 533,630).

This invention can be used as a cooling system by switching the flow of outside air to the system condenser, and passing inside air over the evaporator. We have not detailed this operation in this application, but details of such an arrangement were included in our earlier co-pending application (Ser. No. 533,630).

We claim:

1. In combination, means of circulating a flow of circulating liquid, and means of heating the said flow of circulating liquid by solar radiation to a sensible temperature greater than the sensible temperature of the outside heat sink, and a boiler means of causing liquid refrigerat to boil to a vapor, and means of causing the said flow of circulating liquid to heat the said boiler means, and means of introducing the said vapor into a cylinder, and the said means of introducing including a primary inlet valve, and a piston which is moved in the said cylinder by pressure from the said vapor when the said pressure is adequate to cause this movement, and means of connecting the said piston to a crankshaft so that the movement of the said piston under the influence of the said pressure causes rotation of the said crankshaft in the function of a heat engine, and means of controlling the operation of the said primary inlet valve, and the said means of controlling being influenced by the said rotation of the said crankshaft, and the inside of a building maintained at a sensible temperature higher than the sensible temperature of the outside heat sink, and a condenser in which condensing of refrigerant vapor occurs at a sensible temperature higher than the sensible temperature of the said inside of a building, and means of exhausting the said vapor from the said cylinder to the said condenser, and means of injecting liquid refrigerant from the said condenser into the said boiler means, and an evaporator in which refrigerant liquid evaporates at a sensible temperature lower than the sensible temperature of the outside heat sink, and means of transferring heat from the outside heat sink to the said evaporator to provide latent heat of vaporization, and means of introducing liquid refrigerant into the said evaporator from the said condenser, and means of coupling the said crankshaft to drive a positive displacement compressor means of drawing refrigerant vapor from the said evaporator, and means of discharging the vapor compressed by the said positive displacement compressor means into the said condenser, and means of circulating a fluid medium to contact the said condenser so that the said fluid medium receives a heating effect from the said condenser, and means of circulating the said fluid medium to heat the said inside of a building, and an electric motor means of driving the said crankshaft, and means of automatically controlling the said electric motor means to provide motive power to start the motion of the said function of a heat engine, and means of automatically controlling the said electric motor means to provide motive power to drive the said positive displacement compressor means when the said heating effect is required to cause heating of the said inside of a building during times when the sensible temperature in the said boiler means is too low for the said function of a heat engine to provide sufficient power to drive the said compressor means fast enough to provide the said heating effect in sufficient quantity to keep the said inside of a building heated to a pre-determined sensible temperature, and a secondary inlet valve means of conducting vapor flow from the said evaporator into the said cylinder during times when the sensible temperature of the said flow of circulating liquid is lower than the sensible temperature of the outside heat sink, and means of causing the said motor means to drive the said crankshaft during the said times when the sensible temperature in the said boiler is too low, and means of employing the said crankshaft to drive the said piston in the said cylinder in the alternate function of a compressor which assists the said positive displacement compressor means when the said motor means is driving the said crankshaft.

* * * * *